US012584882B2

(12) United States Patent
Kuznetsov

(10) Patent No.: US 12,584,882 B2
(45) Date of Patent: Mar. 24, 2026

(54) DEVICE FOR DETECTING AND IDENTIFYING ANALYTES IN A MULTICOMPONENT ENVIRONMENT AND METHOD FOR MANUFACTURING SAME

(71) Applicant: Aleksander Evgenevich Kuznetsov, Zelenograd (RU)

(72) Inventor: Aleksander Evgenevich Kuznetsov, Zelenograd (RU)

( * ) Notice: Subject to any disclaimer, the term of this patent is extended or adjusted under 35 U.S.C. 154(b) by 655 days.

(21) Appl. No.: 17/627,609

(22) PCT Filed: Aug. 23, 2019

(86) PCT No.: PCT/RU2019/000592
§ 371 (c)(1),
(2) Date: Jan. 14, 2022

(87) PCT Pub. No.: WO2021/010855
PCT Pub. Date: Jan. 21, 2021

(65) Prior Publication Data
US 2022/0299471 A1 Sep. 22, 2022

(30) Foreign Application Priority Data
Jul. 15, 2019 (RU) ........................... RU2019122149

(51) Int. Cl.
*G01N 27/414* (2006.01)
(52) U.S. Cl.
CPC ..... *G01N 27/4148* (2013.01); *G01N 27/4145* (2013.01); *G01N 27/4146* (2013.01)
(58) Field of Classification Search
CPC ........... G01N 27/4145; G01N 27/4146; G01N 27/4148; G01N 27/26; G01N 27/4141;
(Continued)

(56) References Cited

U.S. PATENT DOCUMENTS

2011/0059544 A1 3/2011 Hong et al.
2012/0088990 A1* 4/2012 Bunge ................ A61B 5/14735
600/300
2018/0368743 A1 12/2018 Lin et al.

FOREIGN PATENT DOCUMENTS

EP 3 163 296 5/2017

OTHER PUBLICATIONS

International Search Report for PCT/RU2019/000592 dated Mar. 19, 2020, 6 pages.
(Continued)

*Primary Examiner* — Gurpreet Kaur
(74) *Attorney, Agent, or Firm* — Nixon & Vanderhye PC

(57) ABSTRACT

The present invention relates to electronic devices for the high sensitivity and selectivity detection and identification of volatile compounds in a gaseous medium, as well as of dissolved compounds in aqueous solutions. The claimed integrated circuit is intended for detecting and identifying analytes in a multicomponent medium and comprises at least one first microfluidic channel integrated in at least part of the integrated circuit surface, at least one ion-selective transistor with a sensitive surface and a circuit for processing the transistor signals. Furthermore, the first microfluidic channel has an inner surface and an outer surface. At least part of the first microfluidic channel outer surface is made in the form of a porous hydrophobic membrane. Moreover, the sensitive surface of the ion-selective transistor is located in the first microfluidic channel under the porous hydrophobic membrane, and at least one sensitive surface pad of the said transistor is functionalized with at least one type of biological receptor for binding the analyte of interest. The present invention also relates to a device for detecting and identifying analytes in a multicomponent environment, comprising a substrate, the above-described integrated circuit located on top of the said substrate and an encapsulating
(Continued)

layer on top of the integrated circuit. That said, at least one medium supply channel and at least the second microfluidic channel are located in the encapsulating layer in such a way that the second microfluidic channel is connected to the first microfluidic channel and the medium supply channel is located in the porous hydrophobic membrane region. The technical result achieved by the proposed invention implementation is to reduce the lower detection threshold of a «bioelectronic nose» or «bioelectronic tongue» type device, to increase its selectivity in the target compounds identification, to increase the system response rate and to reduce the analysis time in general.

17 Claims, 4 Drawing Sheets

(58) Field of Classification Search
CPC .. G01N 33/0047; G01N 33/5438; A61P 27/00
See application file for complete search history.

(56) References Cited

OTHER PUBLICATIONS

Written Opinion of the ISA for PCT/RU2019/000592 dated Mar. 19, 2020, 5 pages.

Natalia V. Komarova et al., "Development of a novel enzymatic biosensor based on anion-selective field effect transistor for the detection of explosives", Sensors and Actuators B: Chemical 221, Jul. 2015, pp. 1017-1026.

Alexander E. Kuznetsov et al., "Integration of a field effect transistor-based aptasensor under a hydrophobic membrane for bioelectronic nose applications", Biosensors and Bioelectronics 129, Mar. 2019, pp. 29-35.

* cited by examiner

DEVICE FOR DETECTING AND IDENTIFYING ANALYTES IN A MULTICOMPONENT ENVIRONMENT AND METHOD FOR MANUFACTURING SAME

This application is the U.S. national phase of International Application No. PCT/RU2019/000592 filed Aug. 23, 2019 which designated the U.S. and claims priority to RU patent application Ser. No. 2019122149 filed Jul. 15, 2019, the entire contents of each of which are hereby incorporated by reference.

FIELD OF THE INVENTION

The present invention relates to electronic devices for the high sensitivity and selectivity detection and identification of volatile compounds in a gaseous medium, as well as of dissolved compounds in aqueous solutions.

BACKGROUND OF THE INVENTION

The modern devices called «electronic nose» or «electronic tongue», as a rule, are a collection of dissimilar chemical sensors, each of which reacts differently to a particular substance. The signal from each sensor generates an output signal vector corresponding to a smell or a taste, which is further analyzed by the signal processing device. Typically, such a device also includes a device that delivers the test substance to the sensors. The principle of operation of the sensor's sensing element can be based on various physical principles. Specifically, when the sensor's sensing element interacts with a certain volatile substance or a substance dissolved in an aqueous solution, a change in the conductivity, a change in the electrical capacitance, a change in the potential, a change in the vibration frequency, a change in the optical properties, and so on can occur. The main disadvantages of these devices are their low sensitivity which is limited by the 1-100 ppm range, as well as the poor selectivity of the sensors' sensitive elements interaction with the target analyzed substance. Additionally, the described sensing elements are relatively large, and this limits their number in the device and significantly complicates the test substance delivery system design. The devices of the «electronic nose» or «electronic tongue» type are characterized by large dimensions, heavy weight and high cost, which also complicates their autonomous and mobile use. As a result, such artificial systems are to a large extent inferior in sensitivity, dynamic range and versatility to biological systems of animal origin.

A relatively cheap and reliable device with a sensitivity of up to 1 ppb characterized by a fairly fast response and allowing accurate differentiation of various multicomponent test substances and determination of their concentration would be much appreciated in such areas as diagnostic medicine, food and perfume industry, in the military and defense sector, in agriculture and chemical industry, as well as in the environmental protection and ecological safety field.

For example, it is known that microorganisms in the process of their metabolism produce various volatile organic compounds depending on the nutrient media types. These organic compounds can be used as various disease markers and can be identified both in the patient's body fluids and in the patient's exhaled air and smell. Moreover, the concentration of the characteristic volatile organic compounds is different at different disease stages. Thus, the diagnostics requires an instrument with a sensitivity of less than 1 ppb capable of selective determination of biomarker ratios in a gaseous sample.

A large number of works has been published in the technical literature that are related to the developments in the field of the «electronic nose» and «electronic tongue» type devices. As this takes place, the known designs, generally, assume the presence of a sensitive elements array for the collection, recording and transmission of information related to the physical systems and of the received information processing scheme. Separately, the designs of the sensor sensitive elements are considered, which can collectively be subdivided into the receptor part (hereinafter referred to as the receptor) and the transforming part (hereinafter referred to as the transducer). The receptor directly interacts with the analyte, the transducer registers this interaction and transforms it into a signal.

The general principles of the artificial olfactory and gustatory systems' construction and organization are set forth in the US patent application U.S. Pat. No. 6,627,154 B1, publ. date Sep. 30, 2003. A method of heterogeneous single chip production of an electronic circuit with sensor hole seats is claimed. Sensor holes were made in a substrate and delimited within the reaction volume, being detected by the sensor changing its electrical properties upon interaction with analyte. Various sensor sensitive elements capable of electrical parameter changes (including those based on the field-effect transistors and the floating gate field-effect transistors) are considered.

In other patents, various nanostructural elements are considered as transducers: those based on silicon nanowires (US 2010/0198521 A1 , publ. date Aug. 5, 2010), on polypyrrole nanotubes (KR101092724 B1, publ. date Sep. 12, 2011), on single-wall carbon nanotubes (KR101288921 B1 publ. date Jul. 8, 2013) and on various two-dimensional materials: graphene (CN107647869A publ. date Feb. 2, 2018) and transition metals' dichalcogenides (US 2017/0102357 A1, publ. date Apr. 13, 2017).

Also, the materials used as receptors in electronic systems are known. These can be either direct transducer materials or special transducer-applied materials. Of all the variety of such organic and inorganic materials, the use of biological receptors, the mammalian olfactory system G-proteins, can be singled out (claimed in U.S. Pat. No. 8,377,706 B2 publ. date Feb. 19, 2013), as well as of antibodies (US 2010/0222224 A1 application, publ. date Sep. 2, 2010). Such artificial biomolecule based olfactory systems are called the «bioelectronic nose».

SUMMARY OF THE INVENTION

The technical problem to be solved by the proposed invention is to create a highly sensitive and highly selective device that can be used both as a «bioelectronic nose» for the volatile substances analysis in gas, and as a «bioelectronic tongue» for the aqueous solution solutes analysis within the concentration range of less than 1 ppm.

The technical result achieved by the proposed invention implementation is to reduce the lower detection threshold of a «bioelectronic nose» or «bioelectronic tongue» type device, to increase its selectivity in the identification of target compounds, to increase the system response rate and to reduce the analysis time in general.

The formulated technical problem and technical result are solved by the following means described below.

The present invention relates to an integrated circuit for detecting and identifying analytes in a multi-component medium. The integrated circuit comprises at least one first microfluidic channel integrated in at least part of the integrated circuit surface, at least one ion-selective transistor with a sensitive surface and a circuit for processing the transistor signals. Furthermore, the first microfluidic channel has an inner surface and an outer surface. At least part of the first microfluidic channel outer surface is made in the form of a porous hydrophobic membrane. Moreover, the sensitive surface of the ion-selective transistor is located in the first microfluidic channel under the porous hydrophobic membrane, and at least one sensitive surface pad of the said transistor is functionalized with at least one type of biological receptor for binding the analyte of interest.

In particular embodiments of the invention, the following elements can be used as the biological receptor for binding the analyte of interest: DNA aptamer, RNA aptamer, peptide-based aptamer, antibody or an antibody fragment, polysaccharide, enzyme, transmembrane protein, olfactory receptor, olfactory binding protein or a whole cell.

In particular embodiments of the invention, a plurality of ion-selective transistor sensitive surfaces can be arranged in the form of a matrix.

In particular embodiments of the invention, the internal surface of the first microfluidic channel is covered with hydrophilic materials characterized by low adsorption to analyte.

In particular embodiments of the invention, the pore wall surfaces and the outer membrane surface are covered with a hydrophobic material.

In particular embodiments of the invention, the ion-selective transistor is realized with a floating gate or without a floating gate.

In particular embodiments of the invention, the sensitive surface of the transistor with a floating gate is located on the internal surface of the first microfluidic channel.

In particular embodiments of the invention, the sensitive surface of the transistor without a floating gate is located on the surface of the transistor that is part of the first microfluidic channel surface.

In particular embodiments of the invention, a reference electrode is integrated into the first and/or second microfluidic channel.

The present invention also relates to the device for the detection and identification of analytes in a multi-component medium comprising a substrate, an integrated circuit located over the said substrate and an encapsulating layer arranged over the integrated circuit, wherein the integrated circuit comprises at least the first microfluidic channel integrated into at least a part of the integrated circuit surface, at least one ion-selective transistor with a sensitive surface and a circuit for processing the transistor signals, wherein the first microfluidic channel has an inner surface and an outer surface, at least part of the outer surface is made in the form of a porous hydrophobic membrane under which the ion-selective transistor sensitive surface is located, and at least one sensitive surface pad of the said transistor is functionalized with at least one biological receptor type for binding the analyte of interest, wherein at least the first medium supply channel and at least the second medium supply channel are located within the encapsulating layer in such a manner that the second microfluidic channel is connected with the first microfluidic channels and the medium supply channel is located in the porous hydrophobic membrane region.

In particular embodiments of the invention, the medium supply channel is made in the form of a gaseous medium supply channel of the protective porous membrane.

In particular embodiments of the invention, a bulk silicon substrate or a SOI substrate can be used as the integrated circuit substrate.

The present invention allows significant improvement of the «electronic nose» and «electronic tongue» type system characteristics, such as sensitivity up to single ppt units (trillionths), selectivity, specificity and speed, as well as the reliability and performance.

The device is small in size and is characterized by a relatively low production cost. Additionally, the device can be used both as a «bioelectronic nose» type system for analyzing volatile substances in a gas, and as a «bioelectronic tongue» type system for analyzing dissolved substances in a liquid.

This is achieved by utilizing the following constructive and technological approaches and solutions.

The device is manufactured by group micromachining methods used in microelectronic production, such as lithography, chemical or plasma-chemical etching of materials and chemical or physical materials deposition. This provides the low cost design with an improved performance due to the reduction of parasitic components in the process of signal transmission from the array of sensitive elements (the ion-selective transistors with a sensitive surface) to the inputs of a microcircuit (the circuit processing transistor signals) located on the same crystal.

Unlike the U.S. Pat. No. 6,627,154 B1 where a heterogeneous fabrication of a sensitive elements array with an electronic chip is claimed, the present invention includes, in addition to a sensitive elements array and an electronic circuit, a heterogeneous fabrication of the porous hydrophobic membrane. This provides an increase in the device's sensitivity and speed and makes it possible to use receptors for analysis. In the case of a gas mixture components analysis, a porous hydrophobic membrane serves as a separator between the supplied gas medium and the aqueous medium in which the receptors operate. In the case of liquid analysis, the porous membrane serves as a filter that provides additional protection of the first microfluidic channel from the external environment. The described design makes it possible to maintain constant parameters of the conditions in the lower channel where the detection aided with the receptor occurs and to supply the analyzed sample to the sensitive elements through the upper level.

BRIEF DESCRIPTION OF THE DRAWINGS

The accompanying drawings which are incorporated to and form part of the present description illustrate the embodiments of the invention and together with the above general description of the invention and the following detailed description of the embodiments explain the principles of the present invention. In the drawings, like numbers refer to like parts or structural elements.

TERMS AND DEFINITIONS

Figure 1:
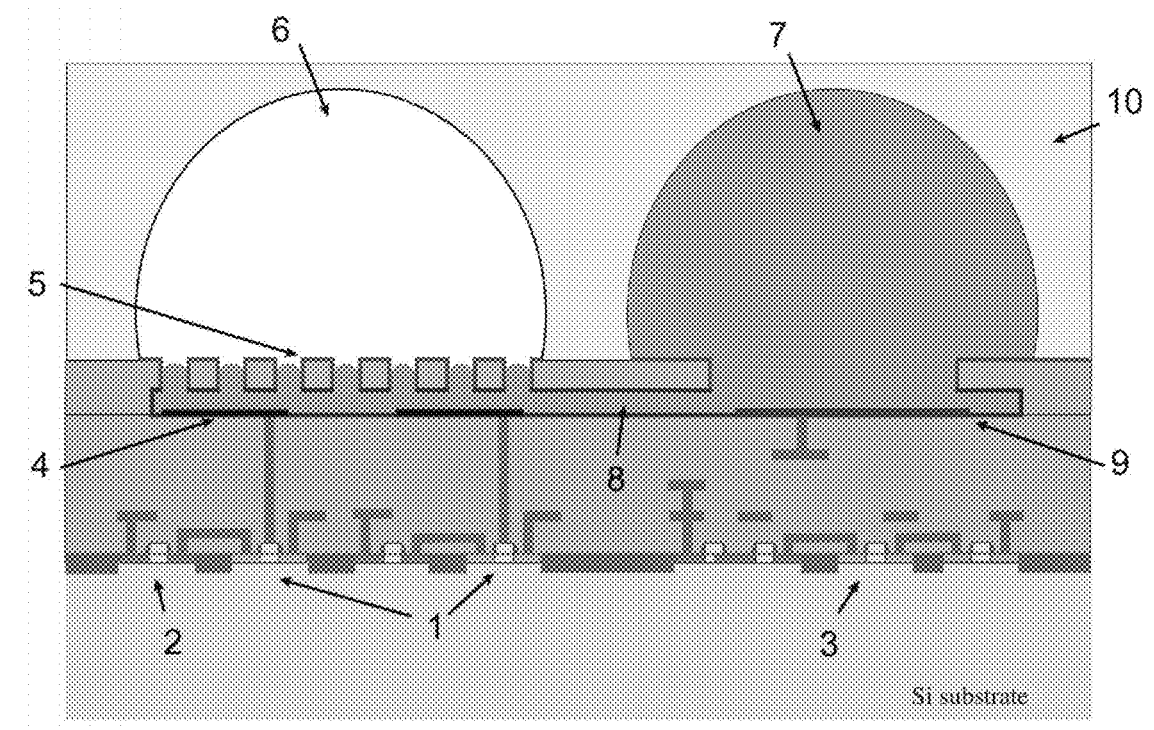
FIG. 1 shows a section of the proposed «bioelectronic nose» type microsystem fabricated on a bulk silicon substrate with ISFET structures with a floating gate (manufacturing option).

Some of the terms used in this description are defined below. Unless specified otherwise, the technical and scientific terms in this application have standard meanings generally accepted in the scientific and technical literature.

In the present description and in the claims, the «comprises», «includes», «including», «having», «equipped», «containing» terms and their other grammatical forms are not intended to be construed in an exclusive sense, but, on the contrary, are used in a non-exclusive sense (that is, in the sense of «having as an integral part of its composition»). Only the expressions like «consisting of» should be construed as a comprehensive list.

In this application, the «ion-selective field-effect transistor» (ISFET) and «ISFET structures» terms are synonymous. In such transistors, the metal transistor gate is replaced with a liquid that is contacted by the reference electrode, and the liquid-dielectric phase interface constitutes a chemically sensitive layer. The interaction of the component being identified with the chemically sensitive layer causes a change in the electric field in the gate region and, therefore, in the threshold potential and current within the transistor, which gives rise to the analytical signal.

In general, in this application, a «sensor» or a «sensor device» or an «analyte detection and identification device» refers to a device transforming the information on the presence of a specific chemical compound (analyte) into a convenient (detectable) signal for conversion. «Biosensors» are a type of sensors in which the recognition system is biochemical in nature and is based on a reaction involving biomolecules or supramolecular biological structures.

The «microsystem», «integrated circuit», «integrated microcircuit», «chip» and «electronic chip» terms are synonymous and represent a microelectronic device—an electronic circuit of arbitrary complexity (a crystal) arranged on a semiconductor substrate (a plate or a film) and placed in an undismountable case or having no such case, if included in the microassembly. Often, an integrated circuit (hereinafter referred to as IC) is understood as a crystal or a film with an electronic circuit as such, and a microsystem (hereinafter referred to as MS)—as an IC enclosed in a package.

The «SOI substrate» (silicon-on-insulator substrate) term signifies a three-layer substrate of the silicon-dielectric-silicon structure. The technology of semiconductor devices manufacturing, based on the use of SOI substrates instead of bulk silicon substrates, allows achieving a significant increase in performance while simultaneously reducing the power consumption and linear dimensions of semiconductor devices.

Additionally, the «first», «second», «third», etc. terms are used simply as conditional markers, without imposing any numerical or other restrictions on the enumerated objects.

The «connected» term means functionally connected, and any number of intermediate elements placed between the connected components (including the absence of intermediate elements) or a combination thereof can be used.

DETAILED DESCRIPTION OF THE INVENTION

The present invention relates to an integrated circuit (IC) comprising a first microfluidic channel with a porous hydrophobic membrane; at least one ion-selective transistor located under the membrane, at least one sensitive surface pad of which is functionalized with at least one biological receptor type for binding the analyte of interest; and a signal processing transistor circuit.

Additionally, the present invention relates to a sensor device comprising such an IC.

Yet more additionally, the present invention relates to a method of making such a sensor device for detecting and identifying analytes in a multi-component medium.

Structurally, the sensor device is a heterointegral microsystem of the «bioelectronic nose» or «bioelectronic tongue» type comprising an electronic chip built using CMOS technology (a complementary metal-oxide-semiconductor structure), with at least one sensing element provided based on the ISFET structures functionalized by biological receptors and located under the porous hydrophobic membrane and a circuit for processing and registering the signals received from sensitive elements, as well as at least one two-level microfluidic system.

FIG. 1 shows a section of a sensor device for detecting and identifying analytes in a multicomponent medium in one embodiment of the invention, wherein the medium is gaseous (the heterogeneous «bioelectronic nose» microsystem). The device contains an integrated circuit fabricated on a bulk silicon substrate. An encapsulating layer (10) is located on top of the integrated circuit.

A bulk silicon substrate or a SOI substrate can be used as the integrated circuit substrate. In the embodiment shown in FIG. 1, a bulk silicon substrate is used.

Various polymer materials and epoxy resin compounds can be used as the encapsulation layer (10) material.

In one of the integrated circuit surfaces, the first microfluidic channel (8) of the first level microfluidics is integrated into at least a part of the integrated circuit surface on the encapsulating layer (10) side. At least a part of the first microfluidic channel (8) outer surface is made in the form of a porous hydrophobic membrane (5).

The first microfluidic channel (8) is in-fed through the second microfluidic channel (7) of the second level microfluidics, which is formed and located in the incapsulating layer (10) and is connected to the first microfluidic channel (8) in a site different from the porous hydrophobic membrane (5) emplacement and is located at a certain distance from it.

In addition to the second microfluidic channel (7), a medium supply channel is also formed in the encapsulating layer (10), being located in the porous hydrophobic membrane region (5). In the embodiment shown in FIG. 1, the medium supply channel is made in the form of a gaseous medium (6) supply channel.

At least one ion-selective transistor (1) with a sensitive surface (4) is placed on the integrated circuit surface in the first microfluidic channel (8) in such a way that the sensitive surface (4) of the ion-selective transistor (1) is located on the inner surface of the first microfluidic channel (8) under a porous hydrophobic membrane (5).

The ISFET structures (1) both with and without a floating gate can be used as ion-selective transistors (1). In so doing, the sensitive elements of the ISFET structure—the floating insulated gate dielectric surface or the gate dielectric surface—can be located directly at the transistor channel level and be part of the first microfluidic channel surface, or they can be placed on the integrated circuit passivating layer surface (in the case of the floating gate use, as shown in FIG. 1).

The dielectric of the ion-selective transistor (1) sensitive surface (4) is made of a material characterized by a high adsorption capacity and, therefore, a high sensitivity to the solution's pH value. The dielectric material can be selected from the following materials: $Ta_2O_5$, $Al_2O_3$, $SiO_2$, $Si_3N_4$, $HfO_2$, $ZrO_2$, $Nb_2O_5$.

The sensitive surface (4) of at least one ion-selective transistor is functionalized by specific biological receptors, which can be RNA or DNA aptamers, peptide based aptamers, antibodies or antibody fragments, polysaccharides, enzymes, transmembrane proteins, olfactory receptors, olfactory binding proteins or whole cells.

In a preferred embodiment of the invention, aptamers, in particular, DNA aptamers, are used as biological receptors. The use of DNA and, in particular, DNA aptamers as a receptor is characterized by a number of advantages. First of all, their use allows increasing the detection selectivity for the compound to be identified within a complex component composition. Additionally, the functioning of the DNA aptamers can be tuned in such a way that all the used DNA aptamers will work under the same conditions but detect different compounds. Thus, the use of aptamers in multi-sensor systems allows simplifying their design, unifying the process of a single sensor creation within the matrix and ultimately reducing the cost of the entire system. Finally, DNA aptamers, unlike other types of receptors, are charac-terized by higher chemical and thermal stability, which increases the stability, reliability and the mean time between failures of the entire system.

That said, the sensitive surface (4) is conventionally divided into areas, and the sensitive surface (4) pads, as a rule, are analyzed by different biological receptors for bind-ing the analyte of interest. However, depending on the sensitive surface (4) pad application, it can be functionalized with a single type of biological receptor or with component biological receptor compositions.

In the preferred embodiment of the invention, when an aptamer is used as the biological receptor, the choice of aptamer in terms of specificity is determined using the SELEX procedure. However, other methods of selecting the aptamer sequence in terms of its specificity to a given analyte can also be applied, e.g., a computer modeling or a one cycle selection.

In one embodiment, the integrated circuit contains ion-selective transistors arranged in the form of a matrix. Arranging of the ISFET structure sensitive surfaces in the form of a matrix has the advantage in that a number of different analytes of interest, e.g., different gases or different biomolecules, such as different DNA fragments, can be measured simultaneously. To this end, each of the said transistors can be functionalized individually, i.e., each transistor can be functionalized to detect a different analyte of interest.

In one embodiment, a plurality of ion-selective transistors can be configured to sense the same analyte, but with a different sensitivity and/or detection level.

In one embodiment of the invention, the chip can be configured with a plurality of microfluidic channels, media supply channels and hydrophobic membranes, respectively (not shown in the drawings), with a separate ion-selective transistor in each channel. Such integrated circuit design will also allow detecting various analytes of interest.

The integrated circuit also includes the signal processing circuitry associated with the respective ion-selective tran-sistors, e.g., via an IC contact bump conductively coupled to the source and drain regions of at least one or more tran-sistors.

The initial displacement on the transistor sensitive sur-faces (4) is set through the reference electrode (9) which in one of the embodiments is integrated into the first micro-fluidic channel (8) and is located on its inner surface in the region of the second microfluidic channel (7) junction with the first microfluidic channel (8). In other embodiments, the reference electrode (9) can be integrated into the second microfluidic channel (7) (not shown in the drawings) or be located simultaneously both in the first microfluidic channel (8) and the second microfluidic channel (7) (not shown in the drawings). For example, the reference electrode (9) can be located on the microcircuit surface at the site of the second channel (7) passing. For example, the reference electrode (9) can be integrated into the solution supply means.

Figure 2:
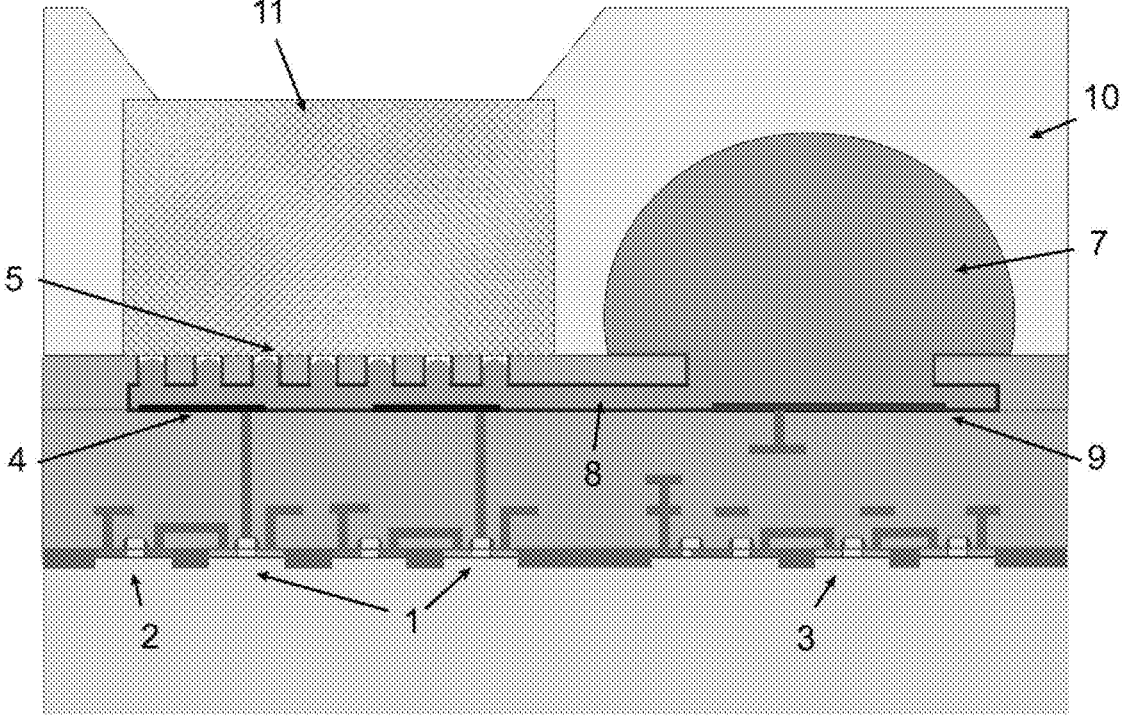
FIG. 2 shows a section of the proposed «bioelectronic nose» type microsystem with a built-in protective porous membrage with ISFET structures with a floating gate (manufacturing option).

FIG. 2 shows a section of the sensor device for detecting and identifying analytes in a multicomponent medium in one embodiment of the invention, wherein the medium is gas-eous (the heterogeneous «bioelectronic nose» microsystem). The device contains an integrated circuit fabricated on a bulk silicon substrate. An encapsulating layer (10) is located on top of the integrated circuit.

In the illustrated embodiment of the invention, a protec-tive porous membrane (11) is used as the medium supply channel formed in the encapsulating layer (10). The mem-brane (1) is located over the area of the porous hydrophobic membrane (5). The analyte, in particular, volatile sub-stances, from the external atmosphere reach the sensitive surfaces (4) of the ion-selective transistors (1) due to diffu-sion. The membrane is manufactured in a so-called post-CMOS cycle. The membrane materials in this case can be selected from the silicon nitride or oxide.

In the illustrated embodiment of the invention, the inte-grated circuit contains floating gate ion-selective transistors (1) the sensitive surfaces (4) of which are located on the inner surface of the first microfluidic channel (8)

Figure 3:
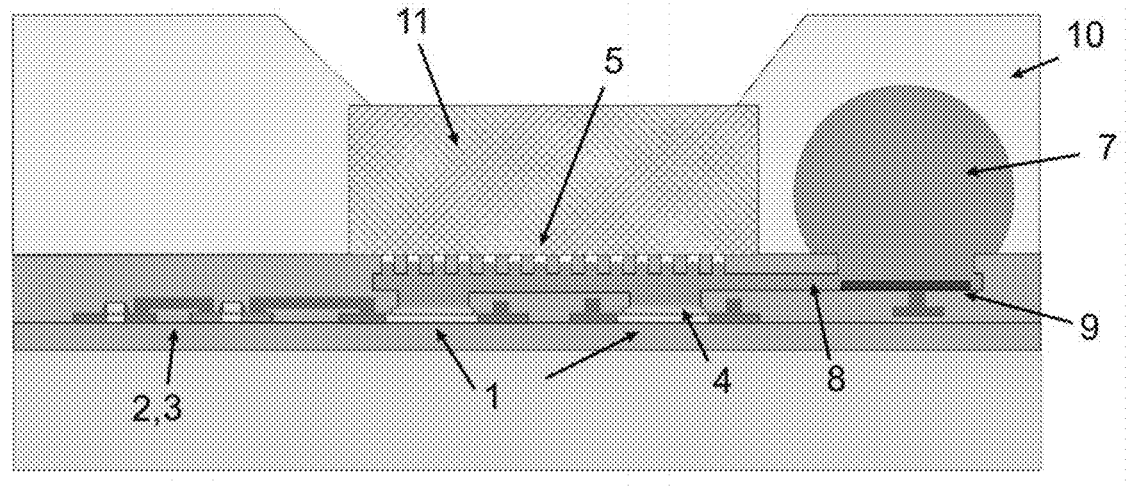
FIG. 3 shows a section of the proposed «bioelectronic nose» type microsystem (manufacturing option) on a SOI substrate with ISFET structures without a floating gate and with a built-in protective porous membrane.

FIG. 3 shows a section of a sensor device for detecting and identifying analytes in a multicomponent medium in one embodiment of the invention, when the medium is gaseous (a heterogeneous «bioelectronic nose» microsystem). In the depicted embodiment of the invention, the integrated circuit is arranged with ion-selective transistors (1) without a floating gate, with the transistors' sensitive surface located on the transistor channel surface and being a part of the first microfluidic channel surface. The integrated circuit in FIG. 3 is located on a SOI substrate. The sensitive surfaces (4) are located directly on the surface of the transistor channels (1).

In all the sensor device embodiments, the hydrophobic porous membrane (5) arranged on at least one part of the first microfluidic channel (8) outer surface is positioned so as to contact the analyte-containing medium.

Figure 6:
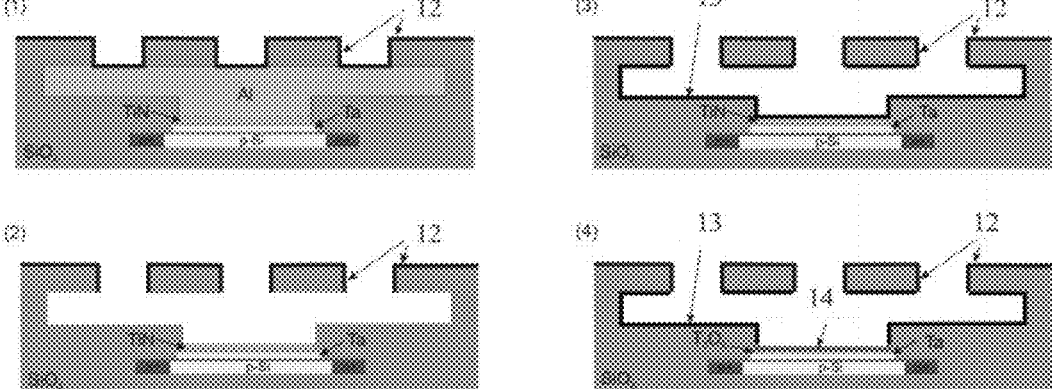
FIG. 6 shows a schematic route of the hydrophobic membrane manufacturing cycle over the sensing elements.

In a particular case, this membrane (5) is made based on a dielectric insulation layer, using aluminum or copper as a sacrificial layer, the pores in the said insulation being formed, preferably, by lithography methods. Other technologies of integral membrane formation are also possible. A schematic route of a hydrophobic membrane manufacturing cycle over the sensing elements is shown in FIG. 6. The stages of the hydrophobic membrane production are as follows:

1. Formation of a sacrificial aluminum layer during the metallization cycle;

2. Precipitation of silicon oxide/nitride;

3. Photolithography in the hydrophobic pore membrane formation area;

4. Plasma-chemical etching through a photoresist for the membrane pores creation;

5. Removing the photoresist and applying a hydrophobic layer to the silicon oxide or silicon nitride surface;

6. Photolithography for the contact pads protection;

7. Liquid etching of the aluminum sacrificial layer;

8. Photoresist removal;

9. Application of a hydrophilic layer into the first microfluidic channel;

10. Liquid etching of titanium nitride;

11. Sensitive surface activation for the receptor immobilization.

The pore wall surfaces, and the membrane outer surface are coated with a hydrophobic material such as organofluoric polymer films, polyorganosiloxane based formulations, carbon nanotube materials and epoxy resin based formulations. In a preferred embodiment, the said membrane surfaces are coated with a self-assembled monolayer (SAM) (12), which provides the effect of blocking the penetration of liquid through the membrane. Thus, the membrane constitutes a barrier for the flow of liquid; at the same time, gas freely passes through the porous membrane (5).

Figure 4:
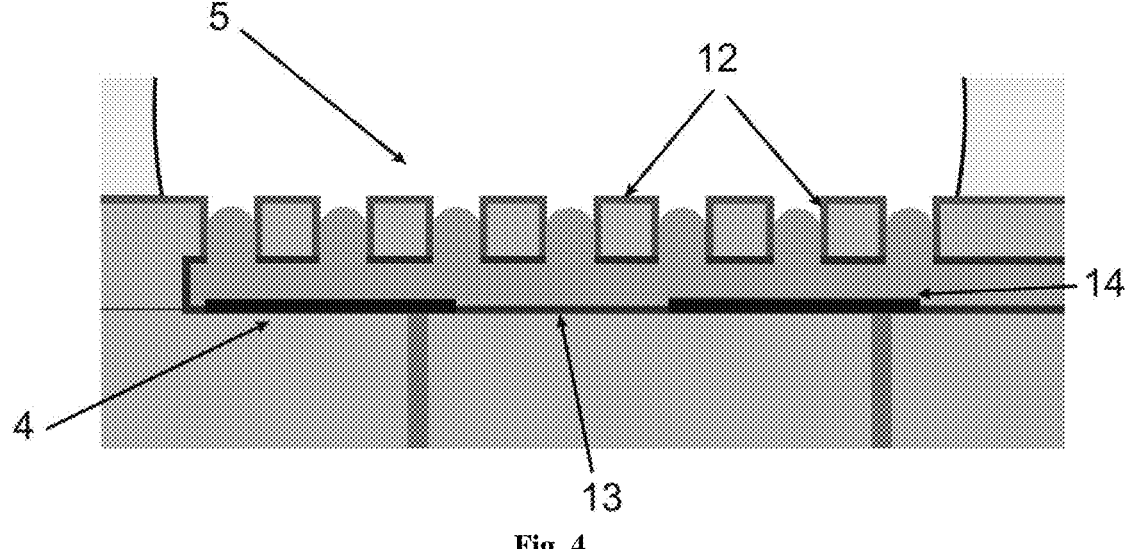
FIG. 4 shows a section of the structure in the hydrophobic porous membrane (5) region and the sensitive surfaces (4) of the ion-selective transistors.

FIG. 4 shows a section of a heterogeneous «bioelectronic nose» microsystem in the region of the porous membrane (5) and the ion-selective transistors' (1) sensitive surfaces (4). The pores and the surface of the membrane (5) are covered with a self-assembled hydrophobic monolayer (SAM) (12) preventing liquid from flowing out into the medium supply channel, in particular, into the gaseous medium (6) supply channel.

If an aqueous solution is used as a multicomponent medium and an aqueous solution is supplied through the medium supply channel, then in the presence of liquid on both sides of the membrane (5) pore surfaces, the exchange of solutes occurs through such a membrane (5) without hindrances. This allows using the developed device both for the gas analysis (in the «bioelectronic nose» mode) and for the analysis of liquids (in the «electronic tongue» mode). The device can also be used as a biosensor with the possibility of multi-analysis usages.

In some embodiments of the sensor device the inner surface of the first microfluidic channel (8) is coated with hydrophilic materials with the low adsorption to the analyte (13). For example, in a preferred embodiment the surfaces can be coated with a hydrophilic SAM layer (13), which provides an automatic channel (8) filling in the case of possible liquid evaporation through the membrane (5) due to the capillary forces acting from the channel (7). As the materials with low adsorption to the analyte that provide capillary properties in the first microfluidic channel (8), various surface modifications can be used, e.g., those obtained by the redeposition of a photoresist during its plasma-chemical etching in a fluorine-containing plasma, by chemical redeposition of polymers or by the carbon nanomaterials deposition. However, the use of a hydrophilic SAM layer is the preferred option, since it can be used in the «integrated» embodiments and the process of its application is simple, efficient and cheap.

The delivery of the analyte to at least one ISFET structure sensitive element can be effected by injecting fluid through the medium supply channel (6) (FIG. 1) or by natural diffusion from the analyzed medium through the protective porous material (11) from the external environment (FIG. 2).

The signal from the sensing elements is picked up and processed by the integrated circuit signal processing circuitry and supplied to the integrated circuit outputs, or, in one embodiment, it can be transmitted using the wireless data transmission means. The integrated circuit can be designed using both CMOS transistors and bipolar transistors, both on a bulk silicon substrate and on silicon-on-insulator (SOI) structures.

Figure 5:
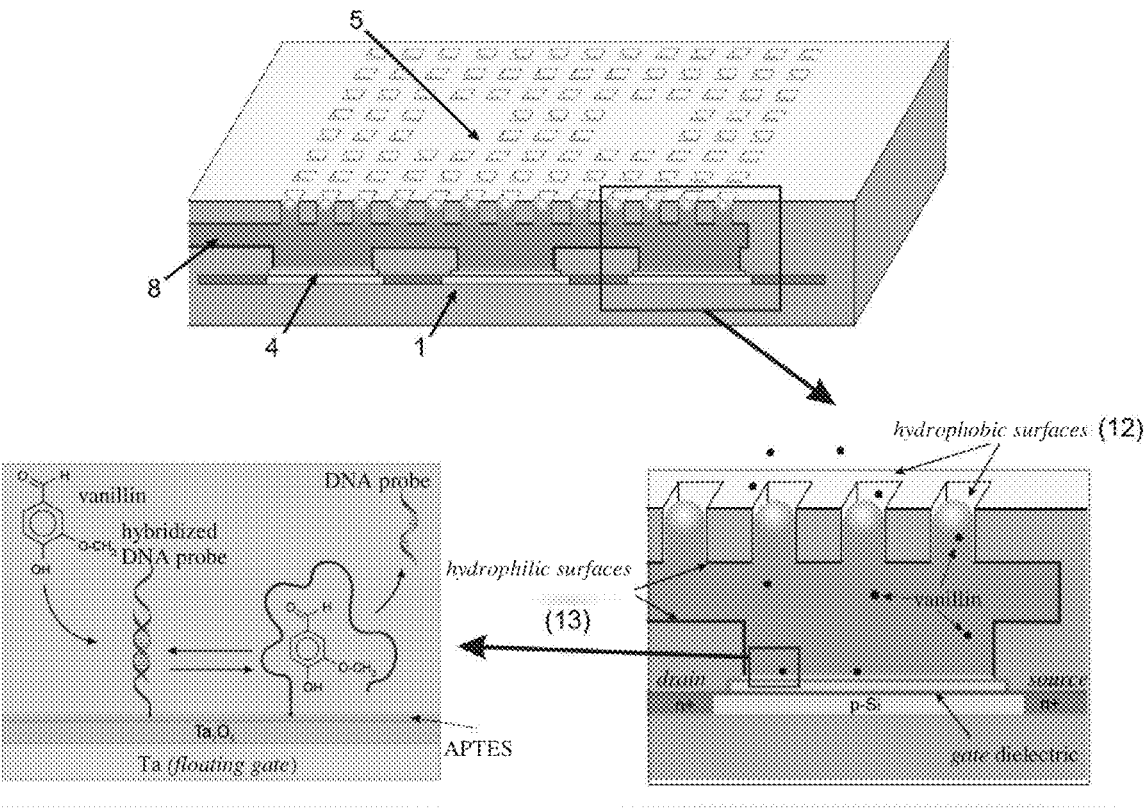
FIG. 5 shows the principle of operation of the «bioelectronic nose» type system (a special case) by the example of the vanillin adsorption on the surface of an ISFET structure with a floating gate.

FIG. 5 shows the principle of operation of the «bioelectronic nose» type microsystem by the example of vanillin adsorption on the surface of an ISFET structure with a floating gate and with the DNA aptamer used as the biological receptor. The electric potential on the transistor channel surface changes with the specific adsorption of vanillin, which leads to a change in the transistor current.

The device's principle of operation is as follows (FIG. 5). The analyte (in this case, vanillin) comes to the hydrophobic porous membrane (5) through the medium supply channel which can be arranged in the form of a gas supply channel (6) or in the form of a protective porous membrane (11). Then the vanillin dissolves in the liquid of the first microfluidic channel (8), passing through the pores of the membrane (5). In the first microfluidic channel (8) the vanillin diffusely reaches the sensitive surfaces (4) of the ion-selective transistors (1), where it can be specifically absorbed. During the adsorption the surface electric charge changes. It can be directly an adsorption charge or it can be a double electric layer space charge at the interface. The change in the electric charge leads to a change in the surface electric potential, which results in a change in the ISFET drain-source current. This change is recorded and processed by the transistor signals processing circuit; then the electrical signals are fed to the integrated circuit outputs or are transmitted, e.g., via a radio channel.

EXAMPLE

Studies have been carried out using the proposed device for detecting and identifying analytes in a multicomponent environment. Vanillin was used as the analyte.

The device was manufactured based on the 1.2 μm CMOS technology design standards, with the integration of a floating tantalum gate on silicon-on-insulator substrates. To integrate the tantalum based floating gate, 50 nm of tantalum was deposited on the gate $SiO_2$ surface after the MOS structures forming operations and before the metallization cycle. Additionally, titanium nitride was deposited in the regions with tantalum depositions. Subsequently, a standard Al-metallization cycle was performed during which a sacrificial layer of aluminum microchannels was additionally formed. After aluminum deposition, standard surface passivation operations were carried out by forming a dielectric $SiO_2/Si_3N_4/SiO_2$ layer. In addition to the MOS structures passivation, this layer was also used as the material for the integrated membrane production. The membrane pores were formed by plasma-chemical etching of the $SiO_2/Si_3N_4/SiO_2$ dielectric layer through a photolithographic mask before the areas of the sacrificial aluminum layer formed at the metallization stage were opened. To form a hydrophobic surface (a hydrophobic layer), the plates were placed in a toluene solution containing hydrophobic silane precursors. After that, the sacrificial aluminum layer was etched in hydrochloric acid, and the exposed microchannel walls surface was modified with a self-assembling layer reducing the negative charge adsorption. At the final stage, etching was carried out in the titanium nitride microchannels using an ammonia crossover solution. During etching, the exposed tantalum is oxidized to Ta2O5 forming a sensitive sensor surface. An aptamer specifically binding to vanillin was immobilized onto this surface. A schematic route of the microsystem w/membrane formation is shown in FIG. 6.

Figures 7, 8:
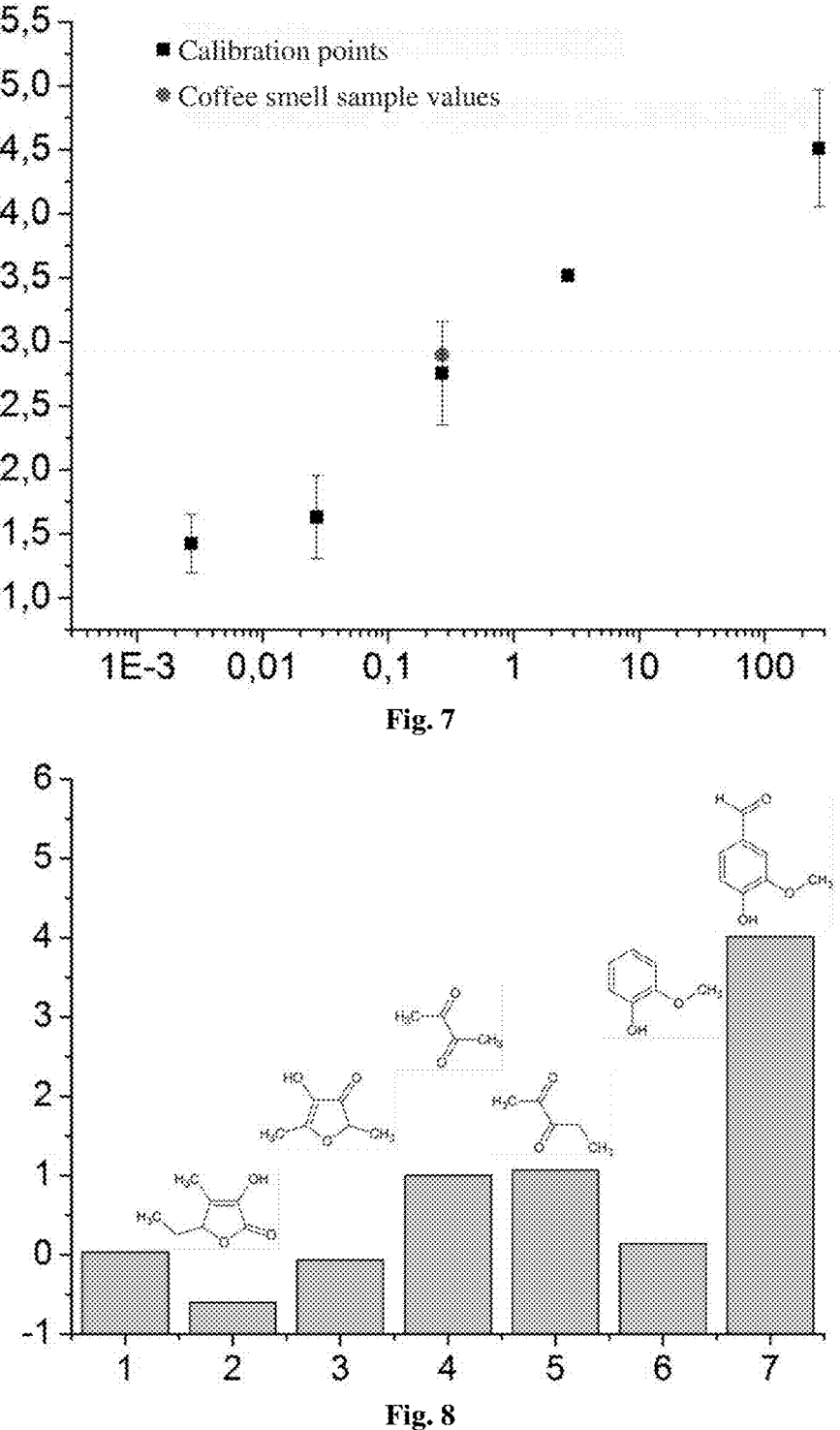
FIG. 7 shows the dependence of the generated system signal on the different vanillin vapor concentrations in a test roasted coffee sample.
FIG. 8 shows the response of the system to various compounds in the gas: 1. carrier gas, 2. maple furaneol, 3. furaneol, 4. butanedione, 5. pentanedione, 6. guaiacol, 7. vanillin (all compounds are components of the coffee smell)

It was found that for the field-effect transistors with a conductance channel length of 560 μm and a width of 12 μm thereof, with a tantalum oxide sensitive surface area of 556×54 μm² located directly at the bottom of the microfluidics first micro-fluid channel above the hydrophobic membrane, the fabricated device vanillin-related sensitivity limit reached the values in the region of 2.7 ppt (FIG. 7). Also, a high selectivity of the device towards the other chemical components of the coffee smell has been shown (FIG. 8).

In FIG. 7 it can be seen that the device selectively registers the vanillin concentration in the sample in accordance with the calibration curve, while not responding to changes in the moisture parameter, as well as to the other flavoring substances present in the analyzed sample, such as maple furaneol, furaneol, butanedione, pentanedione and guaiacol, which suggests that the selectivity is determined by the fact whether the DNA aptamer binds to a chemical compound or not.

The application materials have represented the preferred embodiment of the claimed technical solution, which shall not be used as limiting the other particular embodiments which are not beyond the claimed scope of protection and are obvious to those skilled in the art.

The invention claimed is:

1. An integrated circuit designed for detecting and identifying analytes in a multicomponent environment, comprising at least one first microfluidic channel integrated into at least a part of the integrated circuit surface,
   wherein the first microfluidic channel has an inner surface and an outer surface, and
   at least part of the outer surface is made in the form of a porous hydrophobic membrane;
   at least one ion-selective transistor with a sensitive surface,
   wherein the sensitive surface is located in the first microfluidic channel under the porous hydrophobic membrane, and
   at least one pad of the transistor sensitive surface is functionalized with at least one biological receptor type for binding an analyte of interest; and
   a circuit for transistor signals processing,
   wherein the ion-selective transistor is configured with a floating gate, and
   wherein the sensitive surface of the transistor with a floating gate is located on an internal surface of the first microfluidic channel.

2. An integrated circuit designed for detecting and identifying analytes in a multicomponent environment, comprising
   at least one first microfluidic channel integrated into at least a part of the integrated circuit surface,
   wherein the first microfluidic channel has an inner surface and an outer surface, and
   at least part of the outer surface is made in the form of a porous hydrophobic membrane;

at least one ion-selective transistor with a sensitive surface,
   wherein the sensitive surface is located in the first microfluidic channel under the porous hydrophobic membrane, and
   at least one pad of the transistor sensitive surface is functionalized with at least one biological receptor type for binding an analyte of interest; and
   a circuit for transistor signals processing, and
   wherein the sensitive surface of the transistor is located on the surface of the transistor that is part of one of the surfaces of the first microfluidic channel.

3. A device for detecting and identifying analytes in a multicomponent environment, comprising
   a substrate,
   an integrated circuit located on top of the substrate, and
   an encapsulating layer located on top of the integrated circuit,
   wherein the integrated circuit comprises:
      at least one first microfluidic channel integrated into at least a part of the integrated circuit surface, wherein the first microfluidic channel has an outer surface, and at least part of the outer surface is made in the form of a porous hydrophobic membrane;
      a plurality of ion-selective transistors and a plurality of ion-selective transistor sensitive surfaces arranged in matrix form, wherein the sensitive surfaces are located in the first microfluidic channel under the porous hydrophobic membrane, and at least one pad of the transistor sensitive surfaces is functionalized with at least one biological receptor type for binding an analyte of interest; and
      a circuit for transistor signals processing,
   wherein an internal surface of the first microfluidic channel is covered with hydrophilic materials characterized by low adsorption to analyte, and
   wherein at least one medium supply channel and at least one second microfluidic channel are located in the encapsulating layer so that the second microfluidic channel is connected to the first microfluidic channel of the integrated circuit, and the medium supply channel is located in a region proximate to the porous hydrophobic membrane of the integrated circuit.

4. The device according to claim 3, wherein the multicomponent environment is a gaseous medium or an aqueous solution.

5. The device according to claim 3, wherein a bulk silicon substrate or a SOI substrate is used as the integrated circuit substrate.

6. The device according to claim 3, wherein the medium supply channel is arranged in the form of a gaseous medium supply channel.

7. The integrated circuit according to claim 1, wherein the internal surface of the first microfluidic channel is covered with hydrophilic materials characterized by low adsorption to analyte.

8. The integrated circuit according to claim 1, wherein pore wall surfaces and an outer surface of the membrane are coated with a hydrophobic material.

9. The integrated circuit according to claim 1, wherein the at least one first microfluidic channel includes first and second microfluidic channels, and wherein a reference electrode is integrated into the first and/or second microfluidic channel.

10. A device for detecting and identifying analytes in a multicomponent environment, comprising a substrate, the integrated circuit according to claim 1, located on top of the substrate, and an encapsulating layer located on top of the integrated circuit, wherein at least one medium supply channel and at least one second microfluidic channel are located in the encapsulating layer so that the second microfluidic channel is connected to the first microfluidic channel of the integrated circuit, and the medium supply channel is located in a region proximate to the porous hydrophobic membrane of the integrated circuit.

11. The integrated circuit according to claim 2, wherein the internal surface of the first microfluidic channel is covered with hydrophilic materials characterized by low adsorption to analyte.

12. The integrated circuit according to claim 2, wherein pore wall surfaces and an outer surface of the membrane are coated with a hydrophobic material.

13. The integrated circuit according to claim 2, wherein the at least one first microfluidic channel includes first and second microfluidic channels, and wherein a reference electrode is integrated into the first and/or second microfluidic channel.

14. A device for detecting and identifying analytes in a multicomponent environment, comprising a substrate, the integrated circuit according to claim 2, located on top of the substrate, and an encapsulating layer located on top of the integrated circuit, wherein at least one medium supply channel and at least one second microfluidic channel are located in the encapsulating layer so that the second microfluidic channel is connected to the first microfluidic channel of the integrated circuit, and the medium supply channel is located in a region proximate to the porous hydrophobic membrane region of the integrated circuit.

15. The integrated circuit according to claim 2, wherein the ion-selective transistor is configured with a floating gate.

16. The integrated circuit according to claim 2, wherein the sensitive surface of the transistor lacks a floating gate.

17. The device according to claim 3, wherein the medium supply channel is arranged in the form of a gaseous medium supply channel of the porous hydrophobic membrane.

\* \* \* \* \*